Patented Jan. 11, 1938

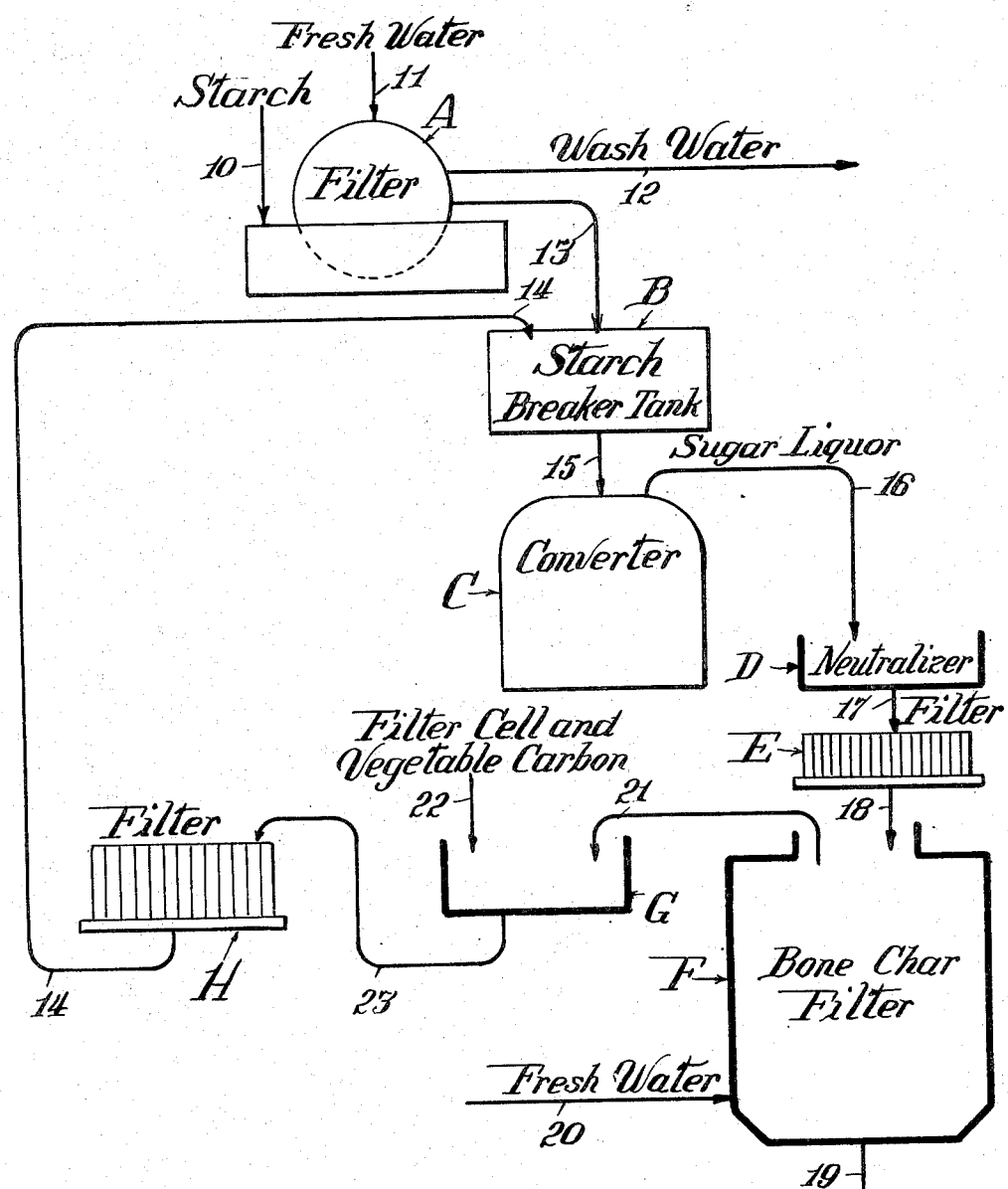

2,105,221

UNITED STATES PATENT OFFICE 2,105,221

PROCESS OF STARCH CONVERSION

Rush O. McCoy, Berwyn, Ill., assignor to International Patents Development Company, Wilmington, Del., a corporation of Delaware Application June 25, 1936, Serial No. 87,192

3 Claims. (Cl. 127—38)

This invention relates to the conversion of starch for the production, for example, of starch syrups and sugars, in which the converted liquor is subjected to bone char filtration and the filters periodically washed with water to free the bone char of the syrup. It has been customary to discharge the wash water from the filters, known as bone wash water, to the sewer. This has resulted in stream pollution and loss of solid substances of some value. The present invention is based upon the discovery that this wash water may be re-used in the process by mixing it with later batches of starch going to the converter, without detriment to the converting operation or impairment of the purity of the ultimate products, whether syrups or sugars, whereby stream pollution from this source is entirely obviated and a certain saving in dry substance corn material is effected.

The invention is illustrated in the accompanying drawing which is a diagrammatic flow sheet of the process. Referring to the drawing, A designates a de-watering and washing filter which receives the starch from the starch tables; the starch line being indicated at 10, the fresh water line at 11, and the wash water line at 12. The filtered starch passes through conduit 13 to a breaker tank B. Here it is mixed with purified bone wash water from a previous conversion, as will be described, which enters the breaker tank through pipe 14. The starch liquor, at whatever density is required for the conversion desired, passes through pipe 15 to the converter C where the starch is converted by application of heat in the presence of a suitable catalyzer in the usual manner. The sugar liquor is discharged from the converter C through pipe 16 into a neutralizing tank D. From there it passes through pipe 17 to a filter E, which may be a bag or a plate and frame, or other suitable type of filter. The filtrate from filter E enters the bone char filter F through pipe 18. The refined sugar liquor is drawn off from the bone char filter F at 19.

It has been customary to periodically wash the accumulated syrup out of the bone char by flushing the filter with fresh water, the introduction of which is indicated by line 20. In accordance with the present process the bone wash water passes out of the filter F through pipe 21 into a tank G into which is introduced at 22 a filter aid such as kieselguhr and a suitable activated vegetable carbon. The bone wash water, thus treated, passes through pipe 23 to the filter H. The filtrate from H passes through the pipe 14 above referred to to breaker tank B.

The above described process is illustrative and typical. It is the intention to cover all modifications within the scope of the appended claims.

I claim:

1. Process of starch conversion which comprises converting the starch; filtering the converter liquor through bone char; flushing the bone char with water; purifying the bone wash water; and re-using the purified bone wash water in the process by mixing it with starch to be subsequently converted.

2. Process of starch conversion which comprises: converting the starch; filtering the converter liquor through bone char; flushing the bone char with water; treating the bone wash water with activated vegetable carbon and filtering the same; and re-using the purified bone wash water in the process by mixing it with starch to be subsequently converted.

3. Process of starch conversion which comprises: converting the starch; filtering the converter liquor through bone char; flushing the bone char with water; treating the bone wash water with activated vegetable carbon and a filter aid and filtering the same; and re-using the purified bone wash water in the process by mixing it with starch to be subsequently converted.

RUSH O. McCOY.